United States Patent
Lee

(10) Patent No.: US 7,545,432 B2
(45) Date of Patent: Jun. 9, 2009

(54) AUTOMATIC FOCUSING METHOD AND DIGITAL PHOTOGRAPHING APPARATUS USING THE SAME

(75) Inventor: Jeong-ho Lee, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 761 days.

(21) Appl. No.: 11/029,244

(22) Filed: Jan. 4, 2005

(65) Prior Publication Data

US 2006/0028575 A1 Feb. 9, 2006

(30) Foreign Application Priority Data

Aug. 6, 2004 (KR) .................. 10-2004-0061950

(51) Int. Cl.
- H04N 5/232 (2006.01)
- G03B 13/00 (2006.01)
- G03B 3/10 (2006.01)
- G03B 13/34 (2006.01)

(52) U.S. Cl. ..................... 348/349; 396/121

(58) Field of Classification Search ............... 348/345, 348/346, 347, 348, 349, 350, 354, 353, 356, 348/355; 396/80, 82, 121
See application file for complete search history.

(56) References Cited

U.S. PATENT DOCUMENTS

| | | | | |
|---|---|---|---|---|
| 5,615,398 A * | 3/1997 | Matsuyama | .................. | 396/77 |
| 5,890,021 A * | 3/1999 | Onoda | .................. | 396/121 |
| 6,067,114 A * | 5/2000 | Omata et al. | .................. | 348/345 |
| 7,221,400 B2 * | 5/2007 | Takahashi et al. | .................. | 348/350 |
| 7,224,397 B2 * | 5/2007 | Sasaki | .................. | 348/348 |
| 7,405,862 B2 * | 7/2008 | Nonaka et al. | .................. | 348/348 |
| 2001/0008423 A1 * | 7/2001 | Nakamura | .................. | 348/345 |
| 2001/0035910 A1 * | 11/2001 | Yukawa et al. | .................. | 348/349 |
| 2002/0018139 A1 * | 2/2002 | Yamagata | .................. | 348/333.09 |
| 2003/0048373 A1 * | 3/2003 | Okisu et al. | .................. | 348/350 |
| 2004/0119876 A1 | 6/2004 | Ohmori et al. | | |
| 2005/0212950 A1 * | 9/2005 | Kanai | .................. | 348/345 |

* cited by examiner

Primary Examiner—Sinh N Tran
Assistant Examiner—Albert H Cutler
(74) Attorney, Agent, or Firm—Drinker Biddle & Reath LLP

(57) ABSTRACT

Provided are an automatic focusing method in which a photograph region is brought into focus through automatic movement of a focal lens to a focal position, in response to a photographing-command signal, and a digital photographing apparatus using the method. The method includes dividing the photograph region into a plurality of sub-regions, focusing on the sub-regions and obtaining focal position values, selecting a same focal position value if sub-regions in the same horizontal position have the same focal position value, selecting a same focal position value if sub-regions in the same vertical position have the same focal position value, and moving the focal lens to a focal position corresponding to a focal position value having the shortest focal distance among the selected focal position values.

8 Claims, 15 Drawing Sheets

AUTOMATIC FOCUSING METHOD AND DIGITAL PHOTOGRAPHING APPARATUS USING THE SAME

BACKGROUND OF THE INVENTION

This application claims the priority of Korean Patent Application No. 2004-61950, filed on Aug. 6, 2004, in the Korean Intellectual Property Office, the disclosure of which is incorporated herein in its entirety by reference.

1. Field of the Invention

The present invention relates to an automatic focusing method and a digital photographing apparatus using the same, and more particularly, to an automatic focusing method in which a photograph region is brought into focus through automatic movement of a focal lens to a focal position, in response to a photographing-command signal, and a digital photographing apparatus using the method.

2. Description of the Related Art

A conventional digital photographing apparatus is disclosed in U.S. Pat. Publication No. 119,876 entitled "Method of Notification of Inadequate Picture Quality", filed by the present applicant in 2004. In that disclosure, a focal lens of a digital photographing apparatus is moved to a focal position in response to a photographing-command signal generated by a user, so that a photograph region is automatically brought into focus.

If a digital photographing apparatus focuses automatically on an entire photograph region, then a large amount of data that is unnecessary for focusing has the potential to cause inaccuracies in focusing. Accordingly, some conventional digital photographing apparatuses focus automatically only on the center of a photograph region. If a subject is not situated at the center of the photograph region, however, then the digital photographing apparatus can fail to focus accurately on the subject.

SUMMARY OF THE INVENTION

The present invention provides an automatic focusing method in which the position of a subject can be brought into focus and balanced focusing can be maintained in an entire photograph region, and a digital photographing apparatus using the method.

According to an aspect of the present invention, there is provided an automatic focusing method in which a photograph region is brought into focus through automatic movement of a focal lens to a focal position, in response to a photographing-command signal. The method includes dividing the photograph region into a plurality of sub-regions; focusing on the sub-regions and obtaining focal position values; selecting a same focal position value if sub-regions in the same horizontal position have the same focal position value; selecting a same focal position value if sub-regions in the same vertical position have the same focal position value; and moving the focal lens to a focal position corresponding to a focal position value having the shortest focal distance among the selected focal position values.

In the method used by the digital photographing apparatus, a final focal position value selected from focal position values of a plurality of sub-regions is commonly applied to a horizontal direction or a vertical direction and has a short focal distance. Therefore, there is a high probability that the position of a subject desired by a user will be brought into focus. In addition, balanced focusing can be maintained throughout an entire photograph region.

According to another aspect of the present invention, there is provided a digital photographing apparatus using the automatic focusing method.

BRIEF DESCRIPTION OF THE DRAWINGS

The above and other features and advantages of the present invention will become more apparent by describing in detail exemplary embodiments thereof, with reference to the attached drawings in which.

DETAILED DESCRIPTION OF THE INVENTION

Figure 1:
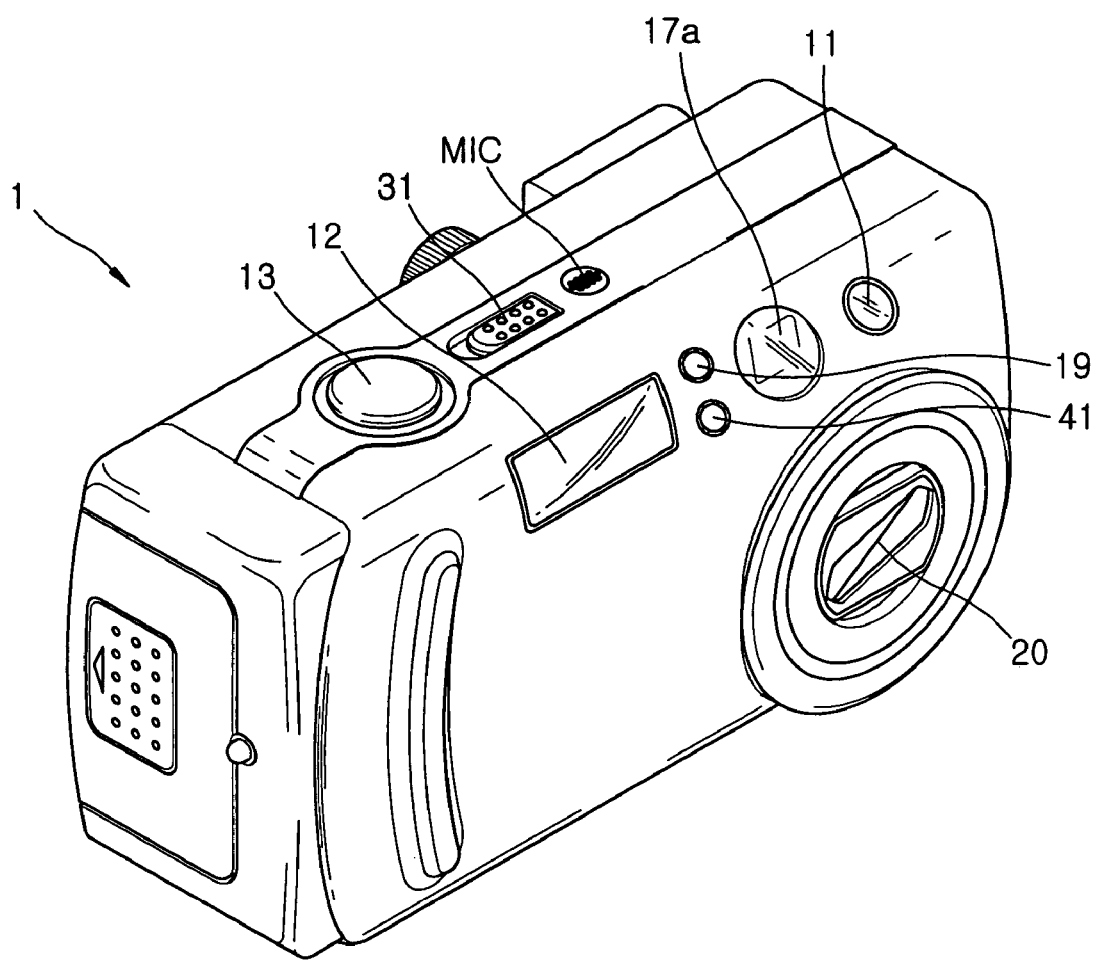
FIG. 1 is a perspective view illustrating the front and the top of a digital photographing apparatus according to the present invention.

Referring to FIG. 1, the front part of a digital photographing apparatus 1 according to the present invention includes a microphone MIC, a self-timer lamp 11, a flash 12, a shutter release button 13, a viewfinder 17a, a flash light intensity sensor 19, a power switch 31, a lens unit 20, and a remote receiver 41.

In a self-timer mode, the self-timer lamp 11 operates for a set period of time from when the shutter release button 13 is pressed to when an image starts to be captured. When the flash 12 operates, the flash light intensity sensor 19 senses the intensity of the light generated by the flash 12 and relays the sensed intensity of the light to a digital camera processor (DCP) 507 of FIG. 3 via a micro-controller 512 of FIG. 3. The remote receiver 41 receives an infrared photographing command signal and relays the infrared photographing command signal to the DCP 507 via the micro-controller 512.

The shutter release button 13 has two levels. In particular, referring to FIGS. 1 and 7, when a user lightly depresses the shutter release button 13 to a first level after operating a wide-angle zoom button $39_W$ and a telephoto zoom button $39_T$, a first level signal S1 from the shutter release button 13 is turned on. When, however, a user fully depresses the shutter release button 13 to a second level, a second level signal S2 of the shutter release button 13 is turned on.

Figure 2:
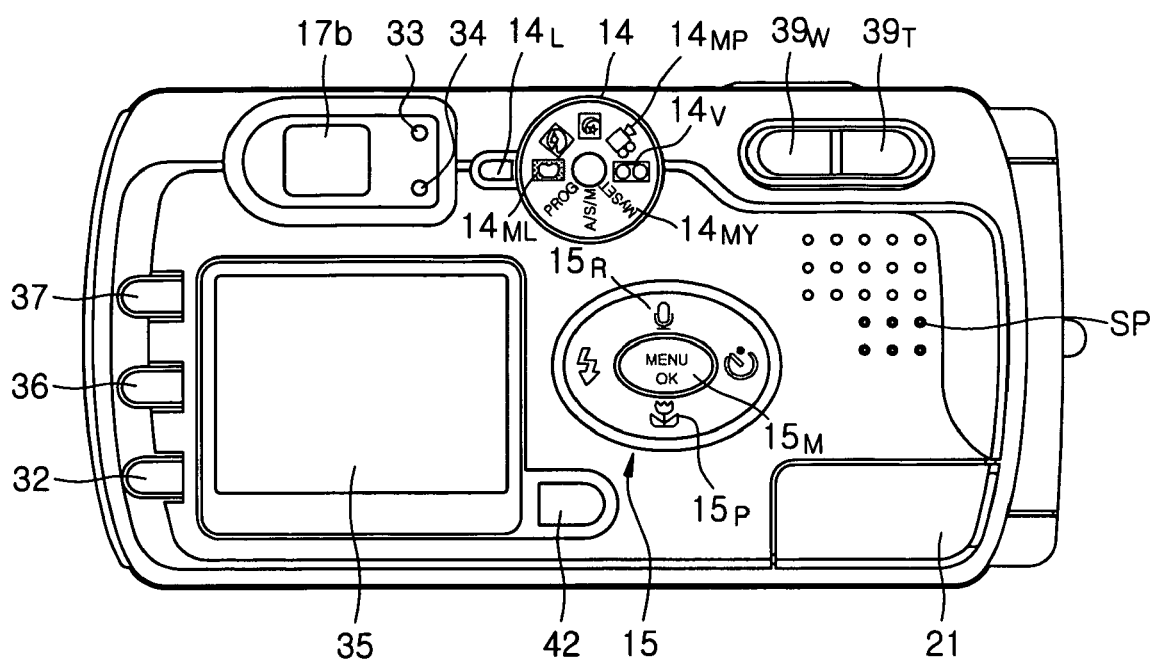
FIG. 2 is a perspective view illustrating the back and the top of the digital photographing apparatus of FIG. 1.

Referring to FIG. 2, the back of the digital camera 1 according to the present invention includes a mode dial 14, function buttons 15, a manual focus/delete button 36, a manual adjust/reproduce button 37, a reproduction mode button 42, a speaker SP, a monitor button 32, an automatic focusing lamp 33, a viewfinder 17b, a flash standby lamp 34, a color LCD panel 35, a wide-angle zoom button $39_W$, a telephoto zoom button $39_T$, and an external interface unit 21.

The mode dial 14 is used for selecting the operating modes of the digital camera 1, such as a synthesized photographing mode $14_{ML}$, a program photographing mode, a character photographing mode, a night view photographing mode, a manual photographing mode, a motion picture photographing mode $14_{MP}$, a user setting mode $14_{MY}$, and a recording mode $14_V$.

The synthesized photographing mode 14 ML is for synthesizing an input image and a supporting image. The user setting mode $14_{MY}$ is an operating mode where a user decides settings for photograph-taking for still image or motion picture photographing mode. The recording mode $14_V$ is for recording audio only.

The function buttons 15 are used for both operation of specific functions of the digital camera 1 and as control buttons for managing the movement of an active cursor on the menu screen of the color LCD panel 35. For example, in the still or motion picture photographing mode $14_{MP}$, a user may set automatic proximity focusing by pressing a macro/move-down button $15_P$. Also, after selecting a specific option from a menu/select-confirm button $15_M$, the macro/move-down button $15_P$ can be used to move the cursor down the LCD panel 35.

When a user presses a voice-memo/move-up button $15_R$, a 10-second recording is possible upon consecutive photographing. Also, after selecting a specific option from the menu/select-confirm button $15_M$, the voice-memo/move-up button $15_R$ can be used to move the cursor up the LCD panel 35. If the user presses the menu/select-confirm button $15_M$ when the active cursor is on a menu item, the operation corresponding to the menu item is performed.

The manual focus/delete button 36 is used for manually focusing or deleting in a photographing mode. The manual adjust/reproduce button 37 is used for manually adjusting of specified conditions and for stopping or reproducing in a reproduction mode. The reproduction mode button 42 is used for converting into a reproducing or preview mode.

The monitor button 32 is used for controlling the operation of the color LCD panel 35. For example, in the photographing mode, when the user presses the monitor button 32, an image and photographing information are displayed on the color LCD panel 35. When the user presses the monitor button 32 again, the color LCD panel 35 is turned off. In the reproduction mode, when the user presses the monitor button 32 while an image file is being reproduced, photographing information about the image file is displayed on the color LCD panel 35. When the user presses the monitor button 32 again, only pure images are displayed.

The automatic focusing lamp 33 operates when focus is well adjusted. The flash standby lamp 34 operates when the flash 12 of FIG. 1 is in a standby mode. A mode indicating lamp $14_L$ indicates a selection mode of the mode dial 14.

Figure 3:
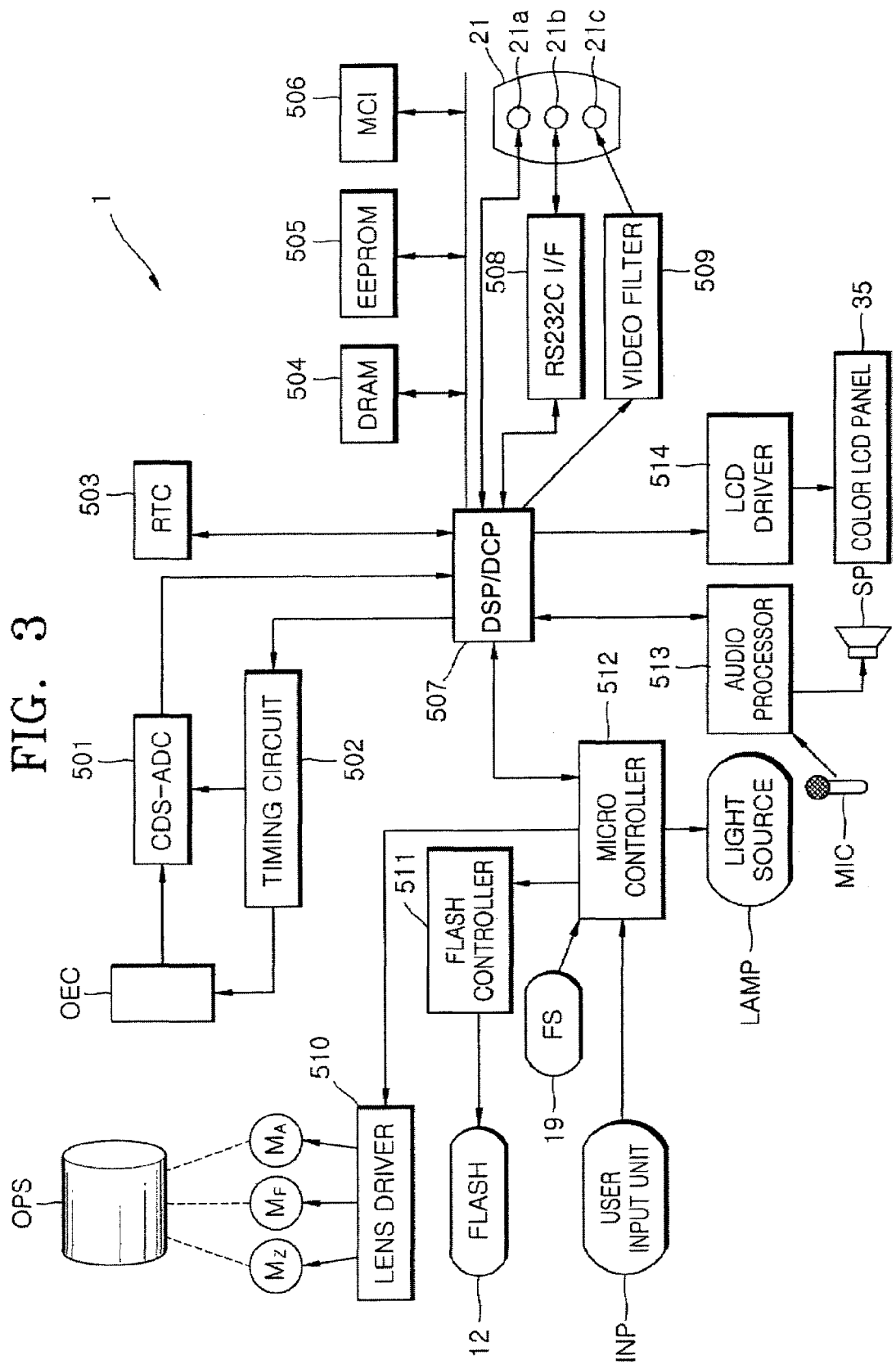
FIG. 3 is a schematic diagram of the entire configuration of the digital photographing apparatus of FIG. 1.
Figure 4:
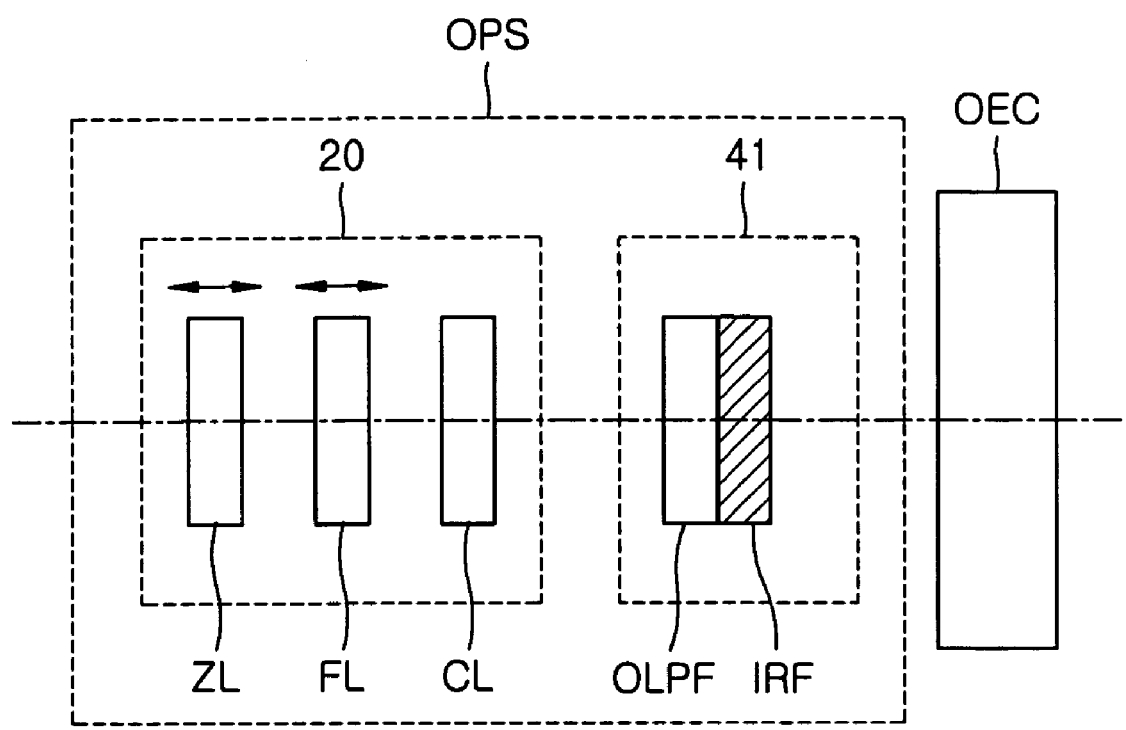
FIG. 4 illustrates the structure of a portion of the digital photographing apparatus of FIG. 1 on which light is incident.

FIG. 3 is a schematic diagram of the entire configuration of the digital camera 1 of FIG. 1. FIG. 4 illustrates the structure of a portion of the digital camera 1 of FIG. 1 on which light is incident. The entire configuration and operation of the digital camera 1 of FIG. 1 will be described below with reference to FIGS. 1 through 4.

An optical system (OPS) including the lens unit 20 and a filter unit 41 optically processes light. The lens unit 20 of the OPS includes a zoom lens ZL, a focal lens FL, and a compensation lens CL.

When the user presses the wide-angle zoom button $39_W$ or the telephoto zoom button $39_T$ included in a user input unit (INP), a signal corresponding to the wide-angle zoom button $39_W$ or the telephoto zoom button $39_T$ is relayed to the micro-controller 512. The micro-controller 512 controls a lens driver 510, thereby running a zoom motor $M_Z$ which in turn moves the zoom lens ZL. In other words, when the user presses the wide-angle zoom button $39_W$, the focal length of the zoom lens ZL becomes short, thereby widening the angle of view. When the user presses the telephoto zoom button $39_T$, the focal length of the zoom lens ZL becomes long, thereby narrowing the angle of view. Since the position of the focal lens FL is adjusted in a state where the position of the zoom lens ZL is set, the angle of view is hardly affected by the position of the focal lens FL.

In the automatic focusing mode, a main controller built into the DCP 507 controls the lens driver 510 through the micro controller 512, thereby driving a focus motor $M_F$. Specifically, the position of the focal lens FL is moved, and, in this process, the position of the focal lens FL, for example, the number of driving steps of the focus motor $M_F$ having the largest amount of high frequency components of an image signal, is set. The operation algorithm of the DCP 507 in the automatic focusing mode will be described in detail with reference to FIGS. 8 through 17.

The compensation lens CL in the lens unit 20 of the OPS is not separately operated because the compensation lens CL compensates for the entire refractive index. A reference numeral $M_A$ indicates a motor for driving an aperture (not shown).

An optical low pass filter included in the filter unit 41 of the OPS eliminates high frequency optical noise. An infrared cut filter included in the filter unit of the OPS blocks the infrared component of incident light.

A photoelectric conversion unit (OEC) of a charge coupled device or a complementary metal oxide (CMOS) semiconductor converts light from the OPS into an analog electrical signal. Here, the DCP 507 controls a timing circuit 502 to control the operations of the OEC and a correlation-double-sampler-and-analog-to-digital converter (CDS-ADC) 501. The CDS-ADC 501 processes an analog signal from the OEC, eliminates high frequency noise, adjusts amplitude, and then converts the analog signal into a digital signal.

A real time clock (RTC) 503 provides time information to the DCP 507. The DSP 507 processes the digital signal from the CDS-ADC 501 and generates a digital image composed of luminance and chromaticity values.

A light source (LAMP) is operated by the micro-controller 512 in response to a control signal generated by the DCP 507 including the main controller. Referring to FIGS. 1 and 2, the light source (LAMP) includes the self-timer lamp 11, the automatic focusing lamp 33, the mode indicating lamp $14_L$, and the flash standby lamp 34. The INP includes the shutter release button 13, the mode dial 14, the function buttons 15, the monitor button 32, the manual focus/delete button 36, the manual adjust/reproduce/terminate button 37, the wide-angle zoom button $39_W$, and the telephoto zoom button $39_T$.

A dynamic random access memory (DRAM) 504 temporarily stores a digital image signal from the DCP 507. An electrically erasable and programmable read only memory (EEPROM) 507 stores algorithms needed for the operation of the DCP 507. A user's memory card is inserted into or removed from a memory card interface 506.

The digital image signal from the DCP 507 is inputted to an LCD driver 514 so that the image is displayed at a color LCD panel 35.

The digital image signal from the DCP 507 can be transmitted via a universal serial bus (USB) connector 21*a* or an RS232C interface 508 and an RS232C connector 21*b* for serial communications. The digital image signal from the DCP 507 can also be transmitted as a video signal via a video filter 509 and a video output unit 21*c*.

An audio processor 513 can relay sound from the microphone MIC to the DCP 507 or the speaker SP. In addition, the audio processor 513 can output an audio signal from the DCP 507 to the speaker SP. The micro-controller 512 controls the operation of a flash controller 511 in response to a signal from the flash light intensity sensor 19, thereby driving the flash 12.

Figure 5:
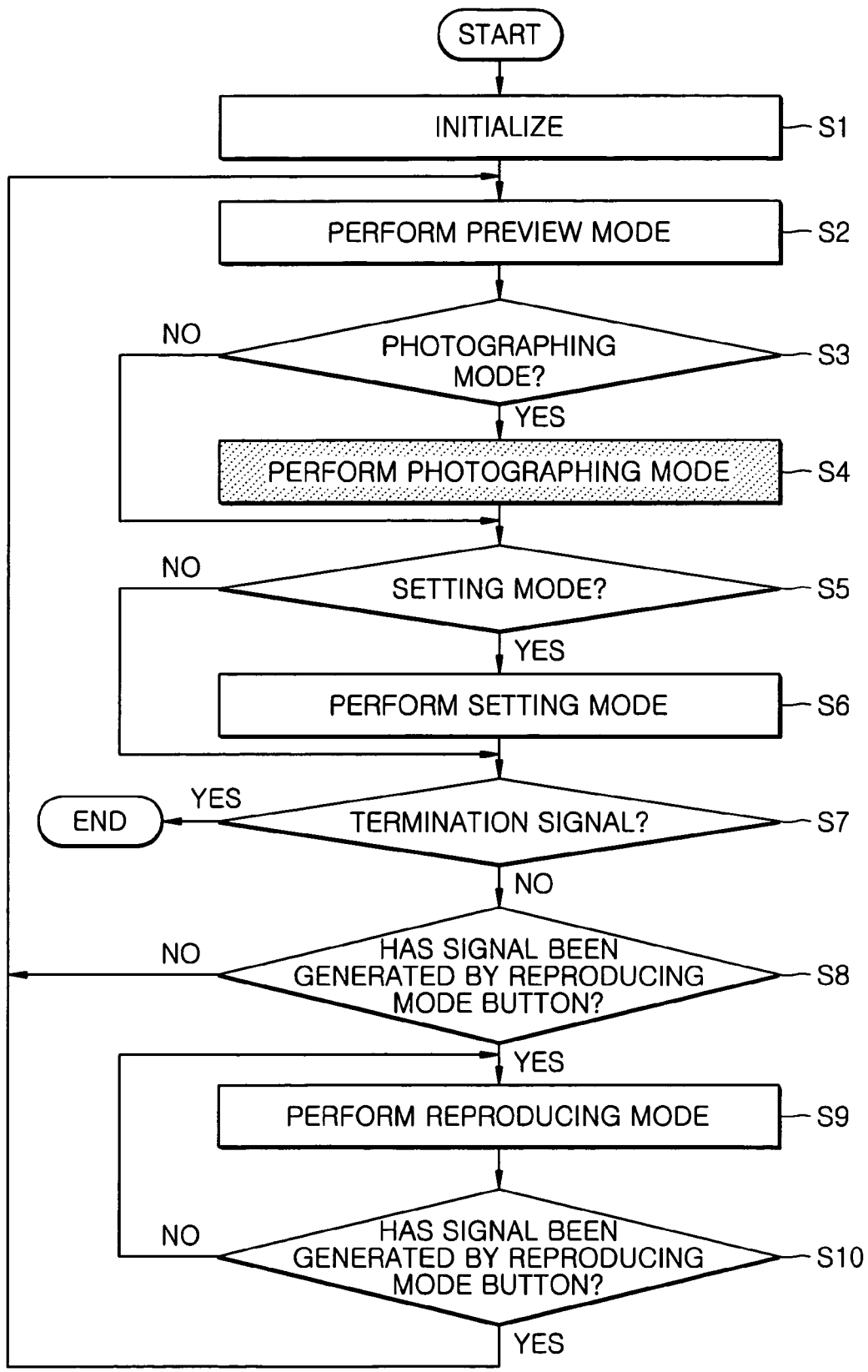
FIG. 5 is a flowchart illustrating a main algorithm of a digital camera processor (DCP) illustrated in FIG. 3.

FIG. 5 is a flowchart illustrating a main algorithm of the DCP 507 illustrated in FIG. 3. The main algorithm of the DCP 507 will be described below with reference to FIGS. 1 through 5.

When power is applied to the digital photographing apparatus 1, the DCP 507 is initialized (S1). After the initialization (S1), the DCP 507 performs a preview mode (S2). In the preview mode, an image input is displayed on the display panel 35. An operation related to the preview mode will be described in detail later with reference to FIG. 6.

When the shutter release button 13 is lightly depressed, a first level signal S1 is sent to the DCP 507. Accordingly, the DCP 507 set the operating mode to the photographing mode (S3). Then, the DCP 507 performs the photographing mode (S4). The photographing mode algorithm will be described in detail with reference to FIG. 7.

When INP generated signals corresponding to a setting mode are input (S5), the setting mode, for setting an operating condition in response to the input signals from the INP, is performed (S6). When a termination signal is not generated, the DCP 507 continues to perform the following step (S7).

When a signal is generated by the reproduction mode button 42 in the INP (S8), a reproduction mode is performed (S9). In the reproduction mode, operating conditions are set in response to the input signals from the INP, and reproduction is performed. When a signal is generated by the reproduction mode button 42 again (S10), the above steps are repeated.

Figure 6:
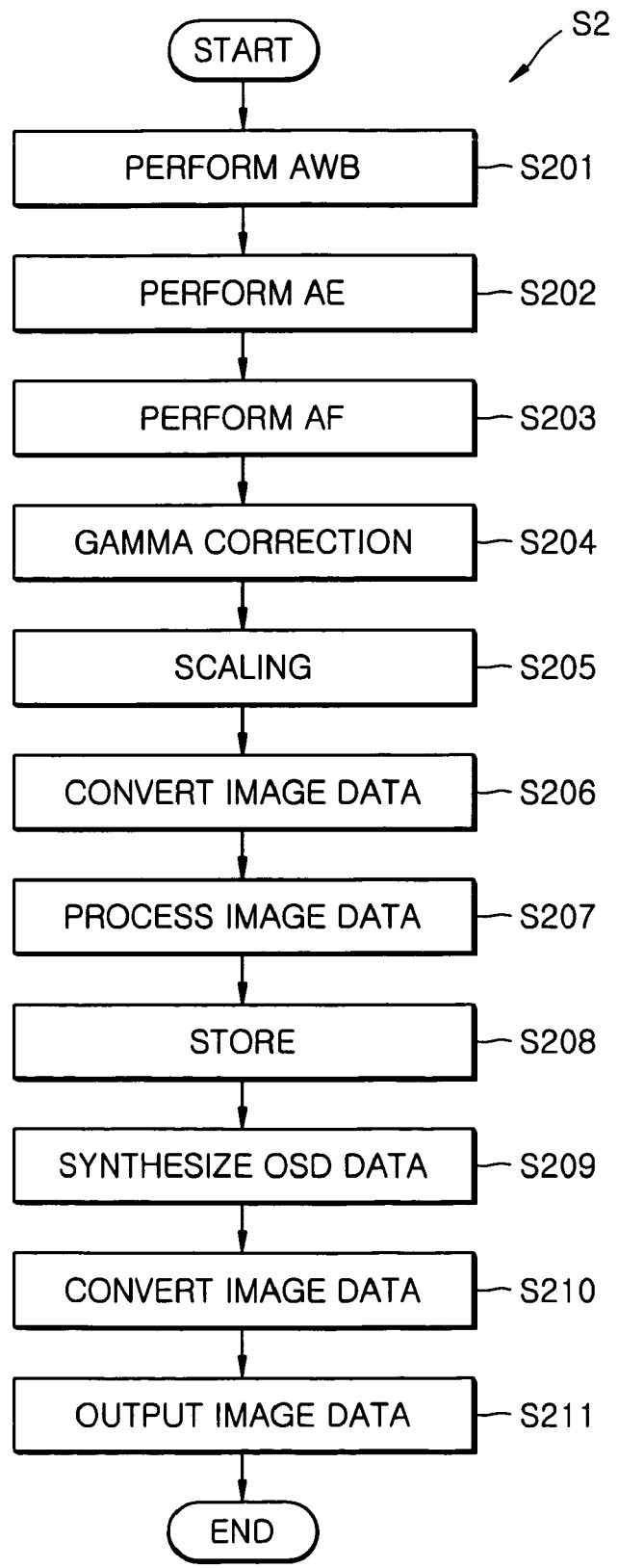
FIG. 6 illustrates a preview mode algorithm included in FIG. 5.

FIG. 6 illustrates the preview mode (S2) algorithm illustrated in FIG. 5. The preview mode (S2) algorithm will be described with reference to FIGS. 1 through 3 and FIG. 6.

The DCP 507 performs automatic white balancing (AWB) and sets parameters related to the white balance (S201). The DCP 507 performs automatic exposure and automatic focusing (S202 and S203).

The DCP 507 performs gamma correction on input image data (S204) and scales the gamma corrected image data to meet display standards (S205). The DCP 507 converts the scaled input image data from an RGB (red, green, and blue) format into a luminance-chromaticity format (S206). The DCP 507 processes the input image data depending on resolution and where the input image data is displayed, and filters the input image data (S207).

The DCP 507 temporarily stores the input image data in the DRAM 504 of FIG. 3 (S208). The DCP 507 synthesizes the data temporarily stored in the DRAM 504 of FIG. 3 and on-screen display (OSD) data (S209). The DCP 507 converts the synthesized image data from the RGB format into the luminance-chromaticity format (S210) and outputs the image data in the converted format via the LCD driver 514 of FIG. 3 (S211).

Figure 7:
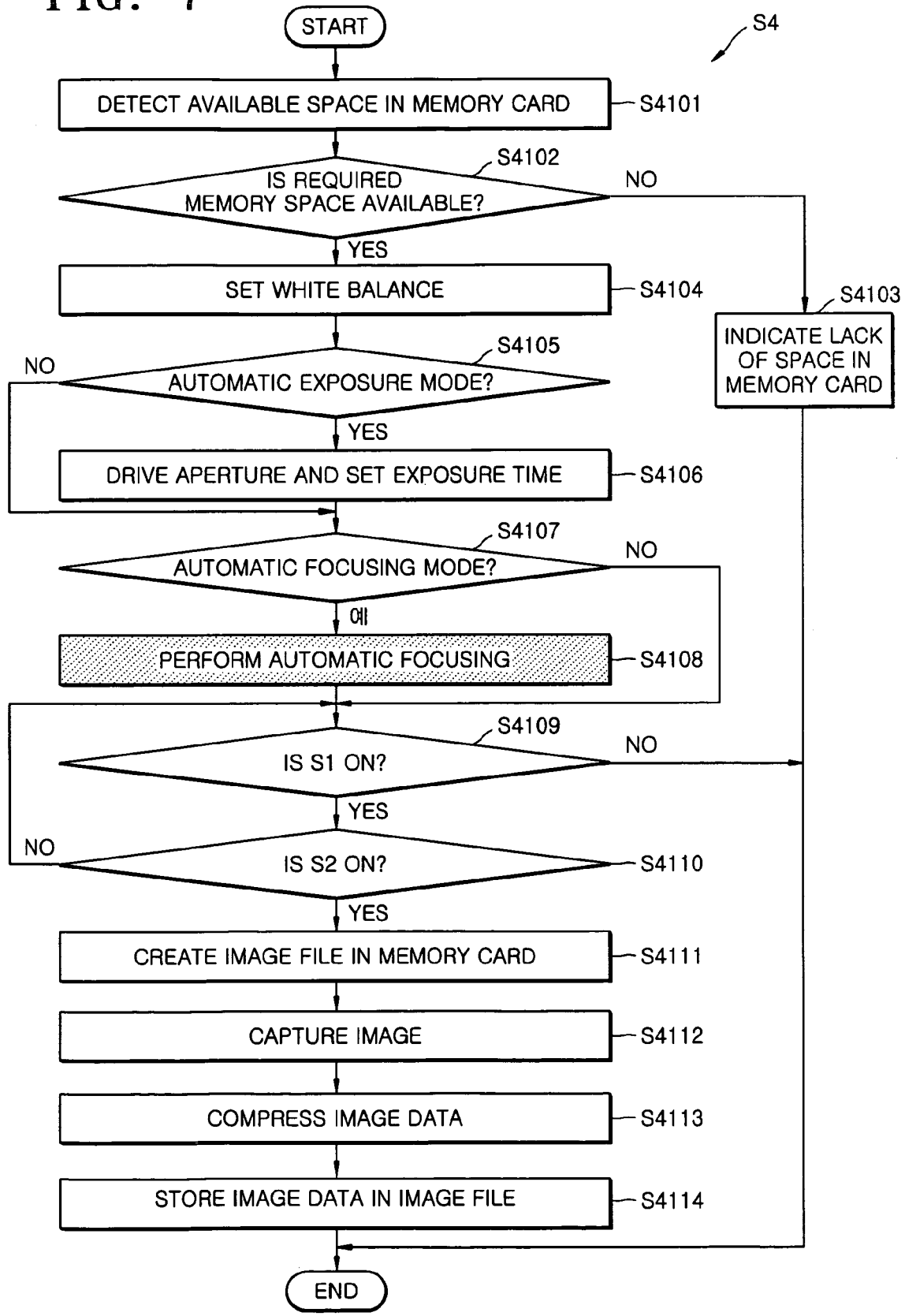
FIG. 7 illustrates a photographing mode algorithm included in FIG. 5.

FIG. 7 illustrates the photographing mode (S4) algorithm illustrated in FIG. 5. The photographing mode (S4) algorithm will be described with reference to FIGS. 1 through 3 and FIG. 7. The photographing mode algorithm starts when the first level signal S1 from the shutter release button 13 is turned on. Here, the present position of the zoom lens ZL of FIG. 4 is already set.

The DCP 507 inspects the remaining recording space in the memory card (S4101) and determines whether the memory card has enough space for recording a digital image signal (S4102). When the memory card does not have enough recording space, the DCP 507 indicates the lack of space of the memory card and stops performing the photographing mode (S4103). When the memory card has enough recording space, the following steps are performed.

The DCP 507 sets white balance, according to a present photographing condition, and sets parameters related to the white balance (S4104). In the automatic exposure mode (S4105), the DCP 507 calculates a degree of opening of the aperture (not shown) by measuring incident luminance, outputs the calculated degree of opening to the micro-controller 512, thereby driving the aperture motor $M_A$, and sets the exposure time (S4106). In the automatic focusing mode (S4107), the DCP 507 performs automatic focusing and drives the focal lens FL (S4108). The automatic focusing algorithm will be described in detail with reference to FIGS. 8 through 17.

When the first level signal S1 from the shutter release button 13 is on (S4109), the DCP 507 performs the following step.

The DSP 507 identifies whether the second level signal S2 is on (S4110). When the second level signal S2 is not on, it means that the user did not press the shutter release button 13 to the second level to take a photograph. Then, the DCP 507 re-performs S4105 through S4110.

When the second level signal S2 is on, it means that the user fully depressed the shutter release button 13 to the second level. Then, the DCP 507 creates an image file in the memory card (S4111). Next, the DCP 507 captures an image (S4112). In other words, the DCP 507 receives image data from the CDS-ADC 501. Then, the DCP 507 compresses the received image data (S4113). The DCP 507 stores the compressed image data in the image file (S4114).

Figure 8:
FIG. 8 illustrates a photograph region of a photoelectric conversion unit (OEC) of FIG. 3 divided into a plurality of sub-regions.
Figure 9:
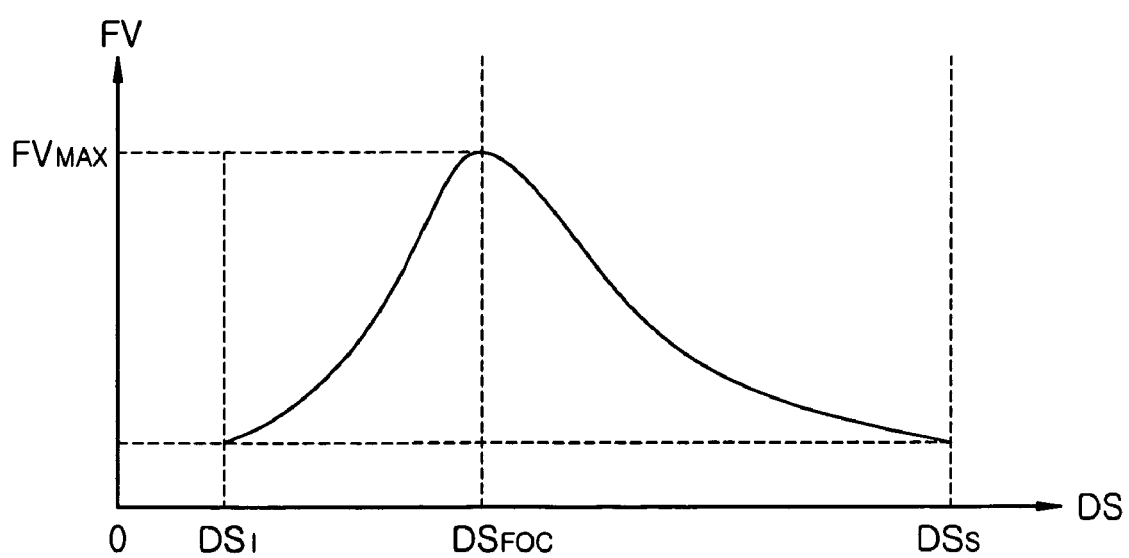
FIG. 9 is a graph for illustrating an automatic focusing algorithm shown in FIG. 7.
Figure 10:
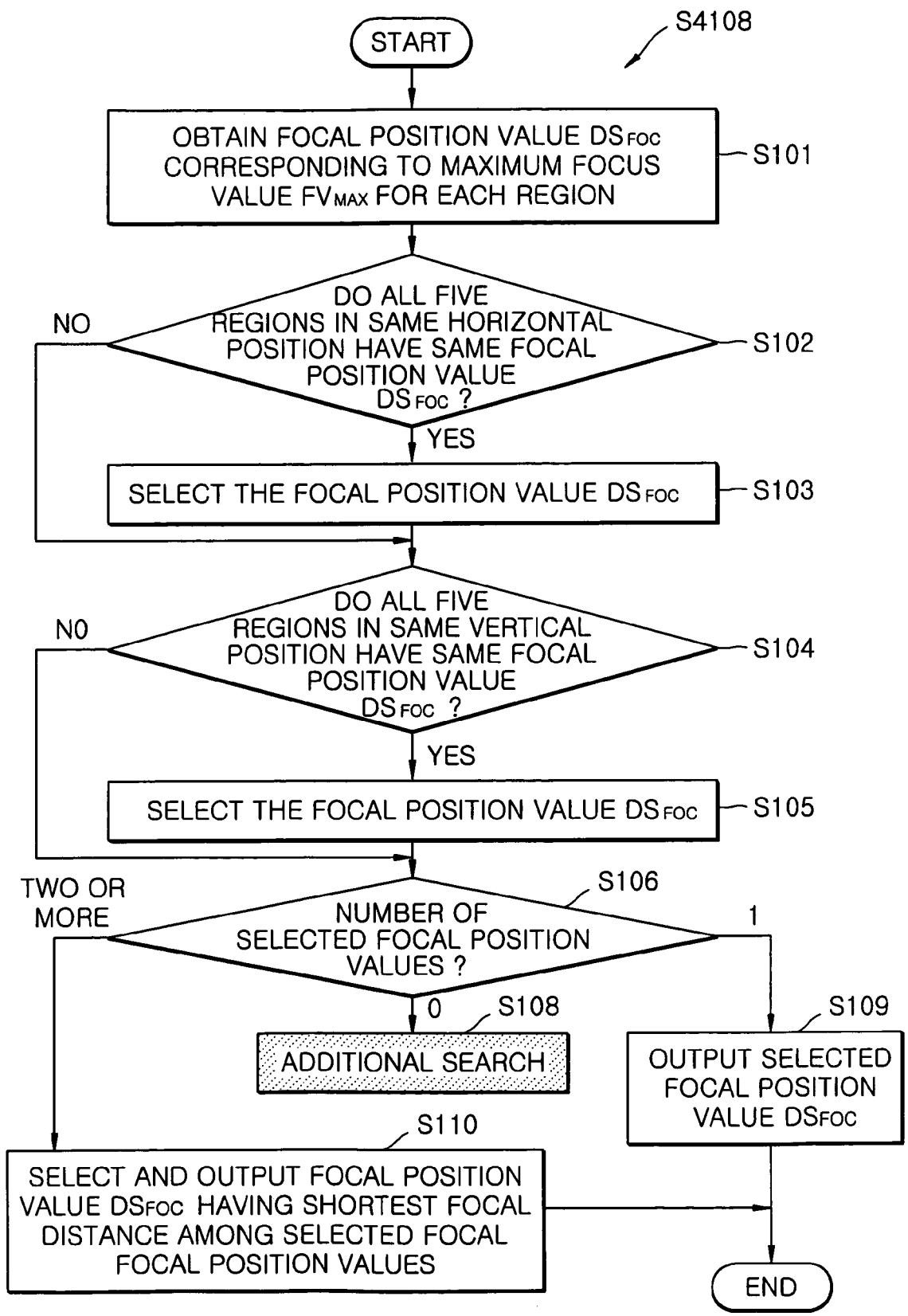
FIG. 10 is a flowchart illustrating a detailed automatic focusing algorithm shown in FIG. 7.

FIG. 8 illustrates a photograph region FR of the OEC of FIG. 3 divided into sub-regions A1 through A25 during the automatic focusing (S4108 of FIG. 7) by the DCP 507. FIG. 9 is a graph illustrating the automatic focusing algorithm (S4108) illustrated in FIG. 7. FIG. 10 is a flowchart illustrating a detailed automatic focusing algorithm (S4108) illustrated in FIG. 7.

Referring to FIG. 9, DS is the number of driving steps of the focal lens FL illustrated in FIG. 4, and FV is a focus value that is proportional to the amount of high frequency contained in an image signal. $DS_I$ is the number of driving steps of the focal lens FL corresponding to a set maximum distance. $DS_{FOC}$ is the number of driving steps of the focal lens FL corresponding to a maximum focus value $FV_{MAX}$. $DS_S$ is the number of driving steps corresponding to a set minimum distance.

The automatic focusing algorithm (S4108 of FIG. 7) will now be described with reference to FIGS. 8 through 10. The DCP 507 scans sub-regions A1 through A25 within a scanning region between $DS_I$ and $DS_S$ and obtains the maximum focus values $FV_{MAX}$ and focal position values $DS_{FOC}$ for A1 through A25 (i.e., the number of driving steps of the focal lens FL) corresponding to the maximum focus values $FV_{MAX}$ (S101). S101 will be described in detail later with reference to FIGS. 12 through 17.

If five sub-regions in the same horizontal position have the same focal position value $DS_{FOC}$ (S102), the DCP 507 selects the focal position value $DS_{FOC}$ (S103). For example, if sub-regions A1 through A5 illustrated in FIG. 8 have the same focal position value $DS_{FOC}$, the DCP 507 selects the focal position value $DS_{FOC}$. In addition, if sub-regions A16 through A20 have the same focal position value $DS_{FOC}$, the DCP 507 selects the focal position value $DS_{FOC}$.

Similarly, if five sub-regions in the same vertical position have the same focal position value $DS_{FOC}$ (S104), the DCP 507 selects the focal position value $DS_{FOC}$ (S105). For example, if sub-regions A2, A7, A12, A17, and A22 illustrated in FIG. 8 have the same focal position value $DS_{FOC}$, the DCP 507 selects the focal position value $DS_{FOC}$. In addition, if sub-regions A3, A8, A13, A18, and A23 have the same focal position value $DS_{FOC}$, the DCP 507 chooses the focal position value $DS_{FOC}$.

If two or more focal position values $DS_{FOCes}$ are selected from S103 and S105, the DCP 507 selects a focal position value $DS_{FOC}$ having the shortest focal distance among the selected focal position values $DS_{FOCes}$ and outputs the focal position value $DS_{FOC}$ to the micro-controller 512 (S106). Accordingly, the micro-controller 512 controls the lens driver 510 to drive the focus motor $M_F$, which then moves the focal lens FL to a final focal position.

If only one focal position value $DS_{FOC}$ is selected from S103 and S105, the DCP 507 outputs the selected focal position value $DS_{FOC}$ to the micro-controller 512 (S106). Accordingly, the micro-controller 512 controls the lens driver 510 to drive the focus motor $M_F$, which then moves the focal lens FL to a final focal position.

Figure 11:
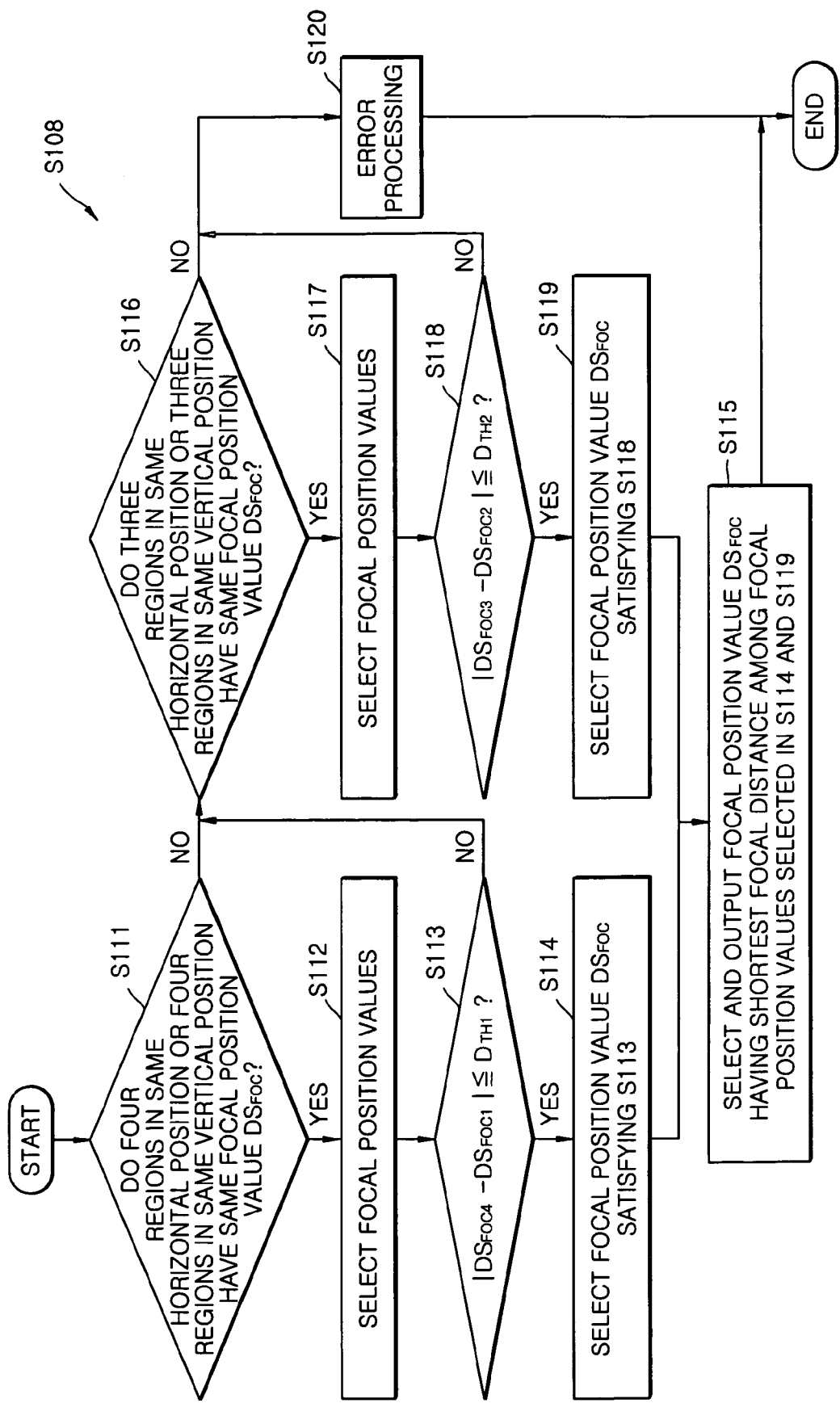
FIG. 11 is a flowchart illustrating an additional search algorithm of FIG. 10 in detail.

If a focal position value $DS_{FOC}$ is not selected from S103 and S105, an additional search is conducted (S108). FIG. 11 is a flowchart illustrating the additional search algorithm (S108) illustrated in FIG. 10 in detail. The additional search algorithm (S108) will now be described with reference to FIGS. 8, 9, and 11.

If four out of five sub-regions in the same horizontal position have the same focal position value $DS_{FOC}$, the DCP 507 selects the focal position value $DS_{FOC}$, and if four out of five sub-regions in the same vertical position have the same focal position value $DS_{FOC}$, the DCP 507 selects the focal position value $DS_{FOC}$ (S111 and S112).

For example, if sub-regions A2 through A5, but not A1, in the same horizontal region illustrated in FIG. 8 have the same focal position value $DS_{FOC}$, the DCP 507 selects the focal position value $DS_{FOC}$. Likewise, if sub-regions A16 and A18 through A20, but not A17, in the same horizontal region illustrated in FIG. 8 have the same focal position value $DS_{FOC}$, the DCP 507 selects the focal position value $DS_{FOC}$.

Meanwhile, if sub-regions A2, A7, A12, and A17, but not A22, in the same vertical region illustrated in FIG. 8 have the same focal position value $DS_{FOC}$, the DCP 507 selects the focal position value $DS_{FOC}$. Likewise, if sub-regions A4, A9, A19, and A24, but not A14, in the same vertical region illustrated in FIG. 8 have the same focal position value $DS_{FOC}$, the DCP 507 selects the focal position value $DS_{FOC}$.

The DCP selects, from selected focal position values $DS_{FOCes}$ from S112, a focal position value $DS_{FOC4}$ whose difference from a focal position value $DS_{FOOC1}$ of a region excluding four sub-regions in the same horizontal position is equal to or less than a threshold value $D_{TH1}$. The DCP selects, from selected focal position values $DS_{FOCes}$ from S112, a focal position value $DS_{FOC4}$ whose difference from a focal position value $DS_{FOOC1}$ of a sub-region excluding four regions in the same vertical position is equal to or less than the threshold value $D_{TH1}$ (S113 and S114)

The DCP 507 finally selects a focal position value $DS_{FOC}$ having the shortest focal distance from focal position values $DS_{FOCes}$ selected from S114 and outputs the focal position value $DS_{FOC}$ to the micro-controller 512 (S115). Accordingly, the micro-controller 512 controls the lens driver 510 to drive the focus motor $M_F$, which then moves the focal lens FL to a final focal position.

If a focal position value DSFOC satisfying the conditions of S111 and S113 is not selected, an additional search is conducted as follows.

If three out of five sub-regions in the same horizontal position have the same focal position value $DS_{FOC}$, the DCP 507 selects the focal position value $DS_{FOC}$, and if three out of five sub-regions in the same vertical position have the same focal position value $DS_{FOC}$, the DCP 507 selects the focal position value $DS_{FOC}$ (S116 and S117).

For example, if sub-regions A17 through A19, but not A16 and A20, in the same horizontal region illustrated in FIG. 8 have the same focal position value $DS_{FOC}$, the DCP 507 selects the focal position value $DS_{FOC}$. Likewise, if sub-regions A22, A25, and A25, but not A21 and A23, in the same horizontal region illustrated in FIG. 8 have the same focal position value $DS_{FOC}$, the DCP 507 selects the focal position value $DS_{FOC}$.

Meanwhile, if sub-regions A2, A7, and A12, but not A17 and A22, in the same vertical region illustrated in FIG. 8 have the same focal position value $DS_{FOC}$, the DCP 507 selects the focal position value $DS_{FOC}$. Likewise, if sub-regions A9, A19, and A24, but not A4 and A14, in the same vertical region illustrated in FIG. 8 have the same focal position value $DS_{FOC}$, the DCP 507 selects the focal position value $DS_{FOC}$.

The DCP selects, from selected focal position values $DS_{FOCes}$ from S117, a focal position value $DS_{FOC3}$ whose difference from an average focal position value $DS_{FOOC2}$ of two out of five sub-regions in the same horizontal position is equal to or less than a threshold value $D_{TH2}$. The DCP selects, from selected focal position values $DS_{FOCes}$ from S117, a focal position value $DS_{FOC3}$ whose difference from an average focal position value $DS_{FOOC2}$ of two out of five sub-regions in the same vertical position is equal to or less than the threshold value $D_{TH2}$ (S118 and S119)

The DCP 507 finally selects a focal position value $DS_{FOC}$ having the shortest focal distance from focal position values $DS_{FOCes}$ selected from S119 and outputs the focal position value $DS_{FOC}$ to the micro-controller 512 (S115). Accordingly, the micro-controller 512 controls the lens driver 510 to drive the focus motor $M_F$, which then moves the focal lens FL to a final focal position.

If a focal position value DSFOC satisfying the conditions of S116 and S118 is not selected, the DCP 507 performs error processing such as outputting an error signal (S120).

Figure 12:
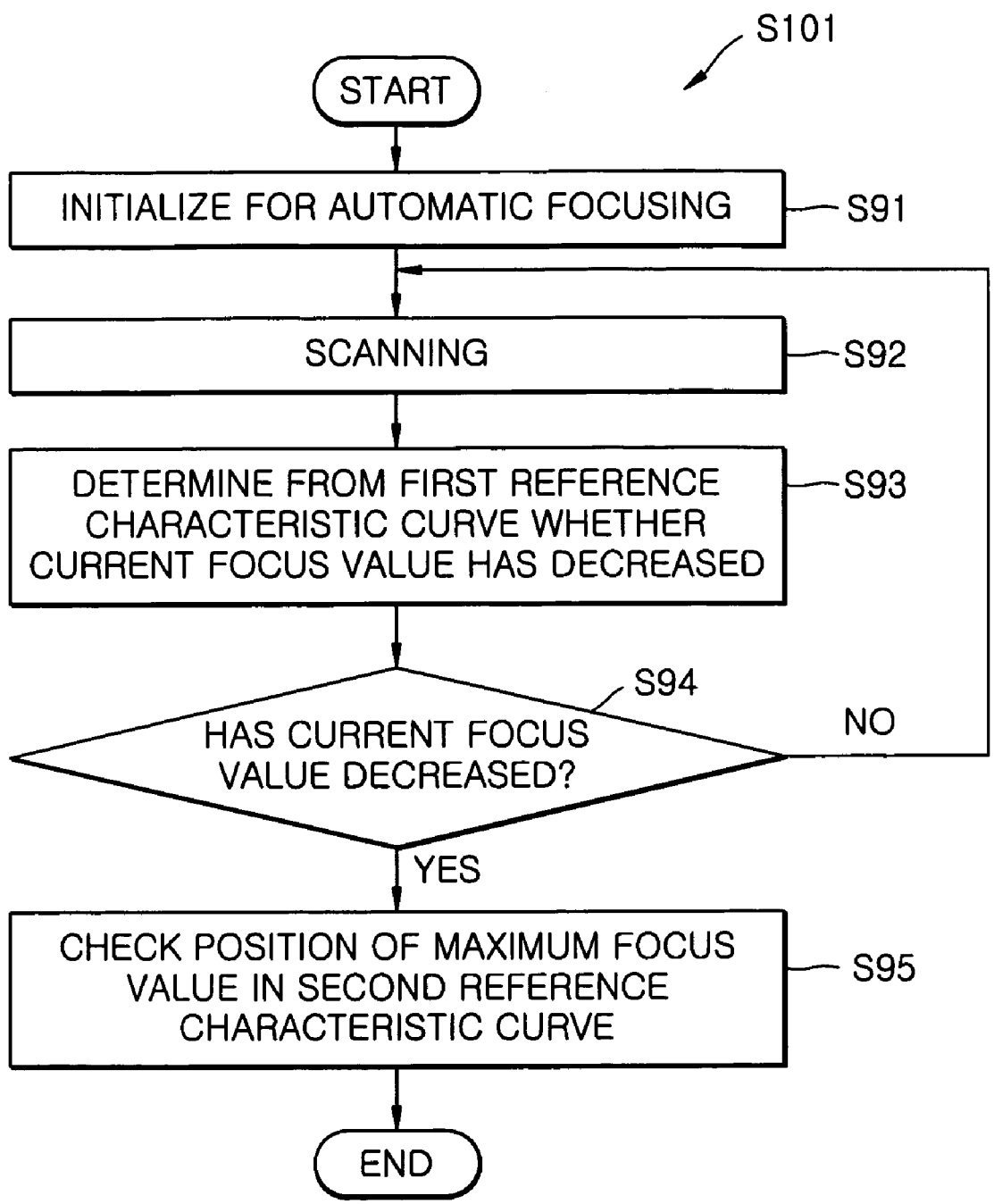
FIG. 12 is a flowchart illustrating S101 of FIG. 10.
Figure 13:
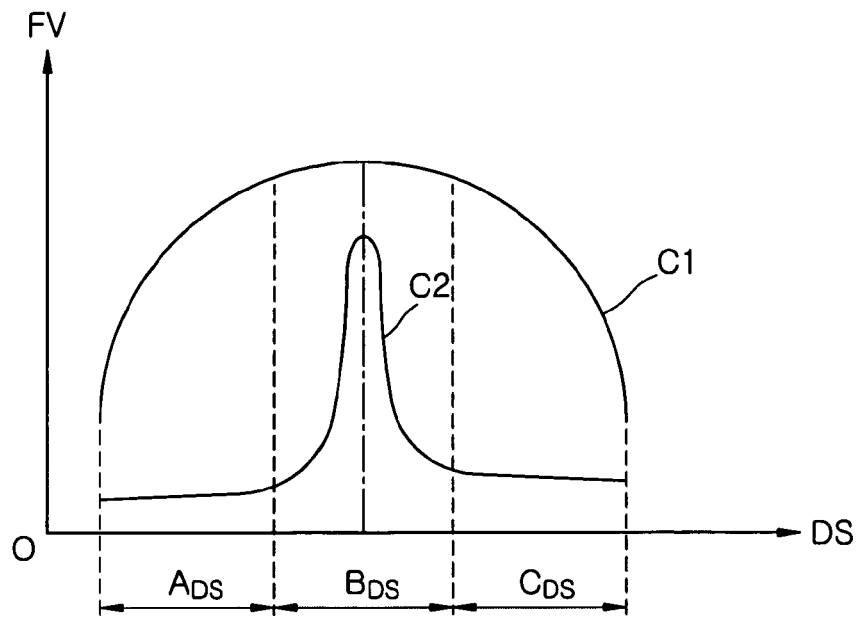
FIG. 13 illustrates first and second reference characteristic curves used in S93 and S95 of FIG. 12.

FIG. 12 is a flowchart illustrating an algorithm for obtaining the maximum focus value $FV_{MAX}$ and the focal position value $DS_{FOC}$ of one of sub-regions A1 through A25 into which the photograph region FR is divided (S101 of FIG. 10). FIG. 13 illustrates first and second reference characteristic curves used in S93 and S95 of FIG. 12.

Referring to FIG. 13, DS is the number of driving steps of the focal lens FL of FIG. 4, and FV is a focus value. C1 is the first reference characteristic curve, and C2 is the second reference characteristic curve. $B_{DS}$ is a region around the maximum focus value $FV_{MAX}$ to be finally set where the second reference characteristic curve C2 is used. $A_{DS}$ and $C_{DS}$ are regions where the first reference characteristic curve C1 is used.

An algorithm for obtaining a maximum focus value $FV_{MAX}$ and a focal position value $DS_{FOC}$ of a region will now be described with reference to FIGS. 12 and 13.

The DCP 507 is initialized for automatic focusing (S91). The DCP 507 performs scanning without using a supporting light source, regardless of the intensity of illumination around a subject (S92).

If a macro-mode for a case where the subject is within a first distance, for example, 30 through 80 centimeters, from the focal lens FL is set by a user, the DCP 507 scans a region of the focal lens FL corresponding to the first distance. Conversely, if a normal mode for a case where the subject is beyond the first distance, for example, 80 centimeters to infinity, from the focal lens FL is set by the user, the DCP 507 scans a region of the focal lens FL corresponding to the distance beyond the first distance.

During macro-mode scanning or normal-mode scanning of the scanning step (S92), the DCP 507 outputs a focus value FV proportional to the amount of high frequency contained in an image signal for every first number of driving steps of the focus motor $M_F$ (FIG. 3), for example, 8 driving steps. Whenever a focus value FV is output, the maximum focus value $FV_{MAX}$ is updated.

Whenever a focus value FV is acquired (S92), it is determined, from a first reference characteristic curve C1 of FIG. 12, whether the output focus value FV has increased or decreased (S93). More specifically, if a percentage of decrease ratio of the output focus value FV to the maximum focus value $FV_{MAX}$ is greater than a first reference percentage based on the first reference characteristic curve C1, the DCP 507 determines that the current focus value FV has decreased. If not, the DCP 507 determines that the output focus value FV has increased.

The first reference percentage of the first reference characteristic curve C1 is low as 10 to 20 percent because there is a high probability that the position of a current focus value FV will not be around the position of the maximum focus value $FV_{MAX}$ to be set finally, and that if not be around the position of the maximum focus value $FV_{MAX}$ to be set, the difference between focus values of adjacent positions is low.

If the output focus value FV is determined to have decreased (S94), the position of a current maximum focus value $FV_{MAX}$ is regarded as the position of the maximum focus value $FV_{MAX}$ in an entire range of motion of the focal lens FL. Accordingly, the DCP 507 checks the position of the maximum focus value $FV_{MAX}$ with reference to the second reference characteristic curve C2 of FIG. 12 (S95). In this case, the macro-mode scanning or the normal-mode scanning of the scanning process (S20) are stopped, and a region around the position of the maximum focus value $FV_{MAX}$ is scanned for every second number of driving steps, for example 1 driving step, which is smaller than the first number of driving steps. Thus, the final position of the focal lens FL is set.

Specifically, the DCP 507 outputs a focus value FV, which is proportional to the amount of high frequency contained in an image signal, for every driving step of the focus motor $M_F$. Whenever a focus value FV is output, the maximum focus value $FV_{MAX}$ is updated.

Whenever a focus value FV is acquired (S92), it is determined, from a second reference characteristic curve C2 of FIG. 12, whether the output focus value FV has increased or decreased (S93). More specifically, if a percentage of decrease ratio of the current focus value FV to the maximum focus value $FV_{MAX}$ is greater than a second reference percentage from the second reference characteristic curve C2, the DCP 507 determines that the current focus value FV has decreased. If not, the DCP 507 determines that the output focus value FV has increased (See FIG. 16 or 17).

The second reference percentage of the second characteristic curve C2 is larger than the first reference percentage because the difference between focus values of adjacent positions around the position of the final maximum focus value $FV_{MAX}$ is large. If the current focus value FV is determined to have decreased (S94), the position of a current maximum focus value $FV_{MAX}$ is regarded as the position of the maximum focus value $FV_{MAX}$ in the entire range of motion of the focal lens FL.

If the current focus value FV is not determined to have decreased (S94), the position of a current maximum focus value $FV_{MAX}$ is not regarded as the position of the maximum focus value $FV_{MAX}$ in the entire range of motion of the focal lens FL. Accordingly, the scanning step (S92) and its following steps are performed.

Figure 14:
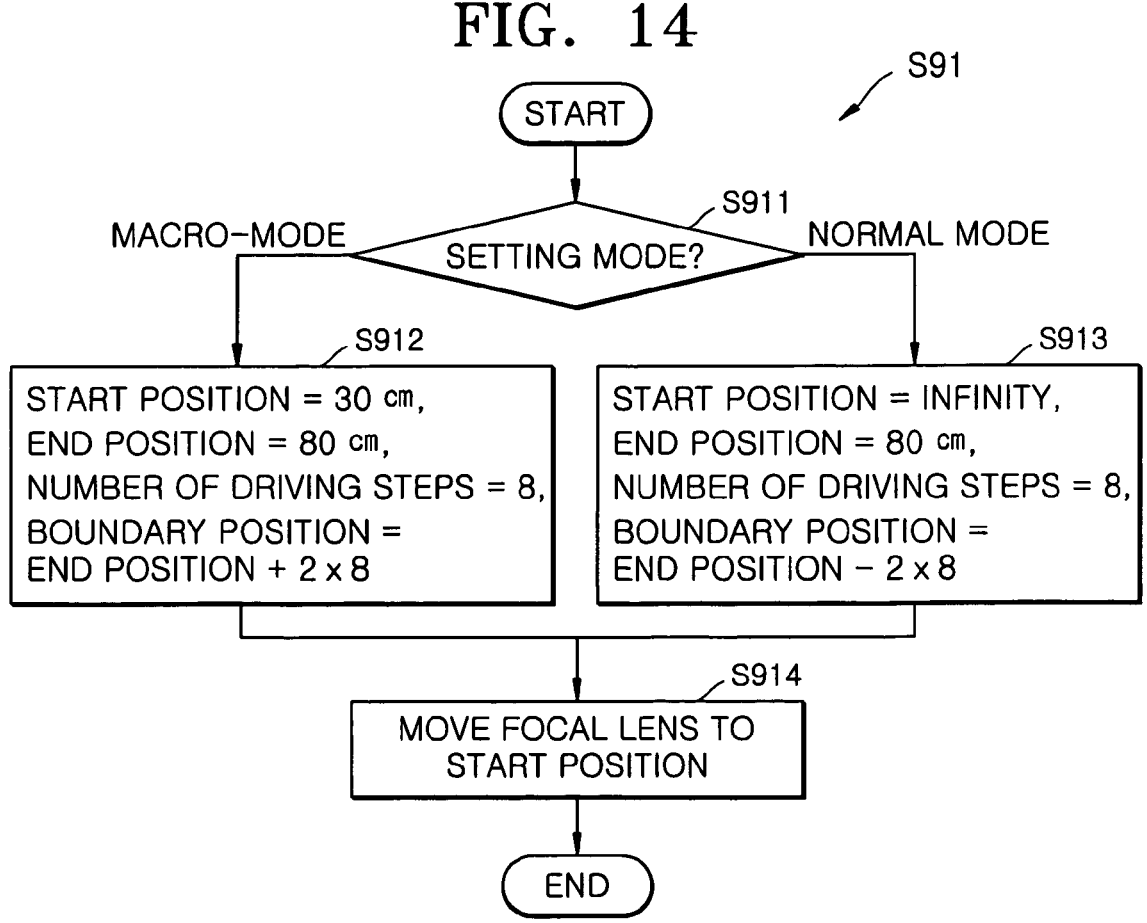
FIG. 14 is a flowchart illustrating S91 of FIG. 12.

FIG. 14 is a flowchart illustrating S91 of FIG. 12. Referring to FIG. 14, if the macro-mode is set by a user (S911), the number of position steps of the focus motor $M_F$ corresponding to a start position at which the focal lens FL starts to move is set to the number of position steps corresponding to 30 centimeters from a subject. The number of position steps of the focus motor $M_F$ corresponding to an end position at which the focal lens FL stops moving is set to the number of position steps corresponding to 80 centimeters from the subject. The number of driving steps of the focus motor $M_F$ is set to 8, and the number of position steps of the focus motor $M_F$ corresponding to the boundary position of the focal lens FL is set to the number of position steps of the focus motor $M_F$ corresponding to the end position of the focal lens FL plus the number of driving steps (8) times 2 (S912). Alternatively, the boundary position may not be used.

If the normal mode is set by the user (S911), the number of position steps of the focus motor $M_F$ corresponding to the start position of the focal lens FL is set to the number of position steps corresponding to infinite distance from the subject. The number of position steps of the focus motor $M_F$ corresponding to the end position of the focal lens FL is set to the number of position steps corresponding to 80 centimeters from the subject. The number of driving steps of the focus motor $M_F$ is set to 8, and the number of position steps of the focus motor $M_F$ corresponding to the boundary position of the focal lens FL is set to the number of position steps of the focus motor $M_F$ corresponding to the end position of the focal lens FL minus the number of driving steps (8) times 2 (S913). The boundary position may not be used.

The DCP 507 drives the focus motor $M_F$ using the micro-controller 512 and moves the focal lens FL to the start position (S914).

Figure 15:
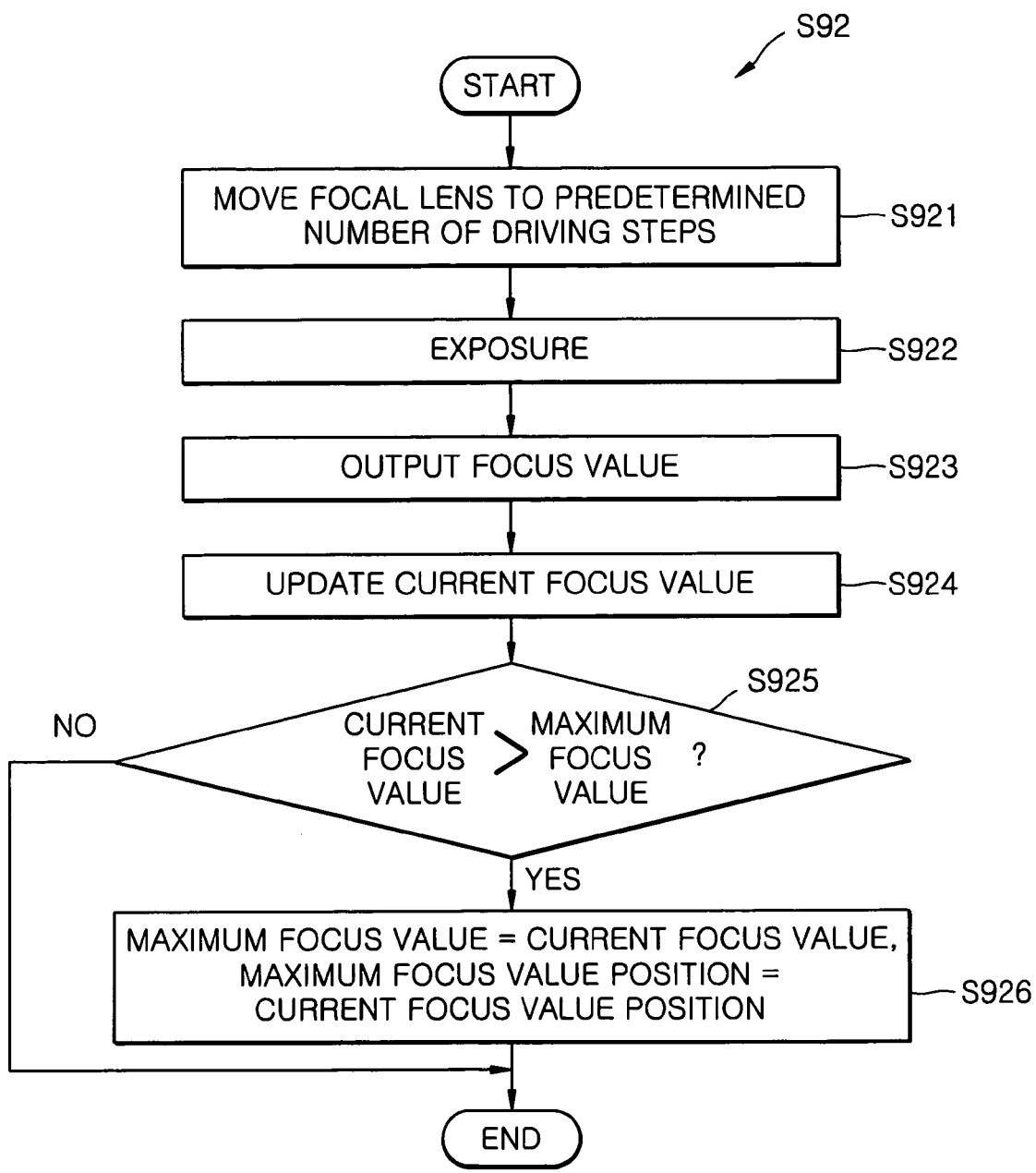
FIG. 15 is a flowchart illustrating S92 of FIG. 12.

FIG. 15 is a flowchart illustrating S92 of FIG. 12. Referring to FIG. 15, the DCP 507 drives the focus motor $M_F$ to a predetermined number of driving steps using the micro-controller 512, thereby moving the focal lens FL (S921).

The DCP 507 drives the aperture motor $M_A$ using the micro-controller 512 and exposes the OEC of FIG. 4 (S922). The DCP 507 processes frame data received from the CDS-ADC 501 and outputs a focus value FV that is proportional to the amount of high frequency contained in the frame data (S923).

The DCP 507 updates a current focus value FV to the output focus value FV (S924). If the updated current focus value FV is greater than the maximum focus value $FV_{MAX}$ (S925), the DCP 507 updates the maximum focus value $FV_{MAX}$ to the updated current focus value FV and, accordingly, the maximum focus-value position is updated to the current focus-value position (S926).

Figure 16:
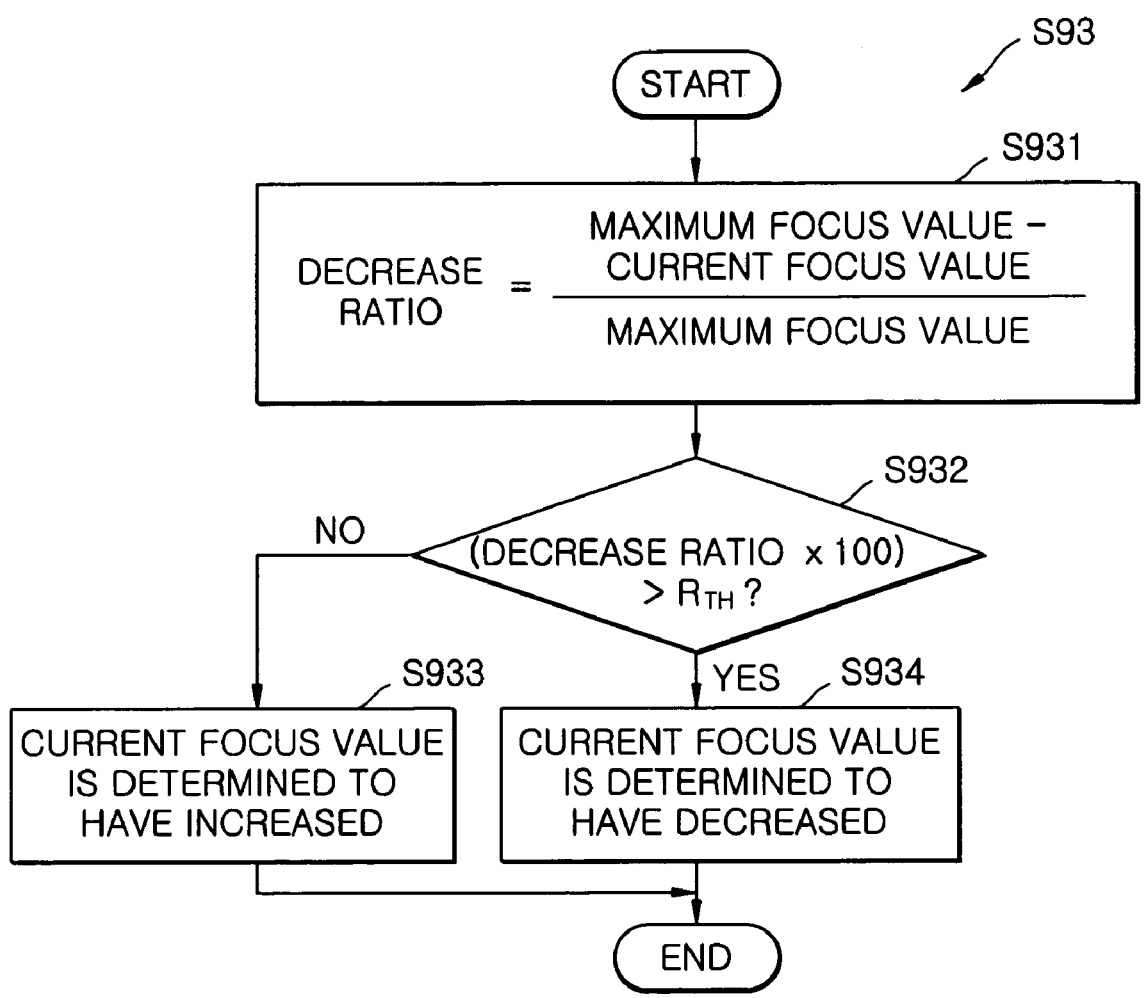
FIG. 16 is a flowchart illustrating S93 of FIG. 12 according to an embodiment of the present invention.

FIG. 16 is a flowchart illustrating S93 of FIG. 12 according to an embodiment of the present invention. Referring to FIG. 16, the DCP 507 calculates a decrease ratio of a current focus value FV to a maximum focus value $FV_{MAX}$ (S931) using $$\text{Decrease Ratio} = \text{Maximum Focus Value} - \text{Current Focus Value/Maximum Focus Value} \quad (1)$$

If the decrease ratio, obtained by multiplying the difference by 100, is greater than the first reference percentage $R_{TH}$ of the first reference characteristic curve C1, the DCP 507 determines that the current focus value FV has decreased (S932 and S934). If not, the DCP 507 determines otherwise (S932 and S933).

Figure 17:
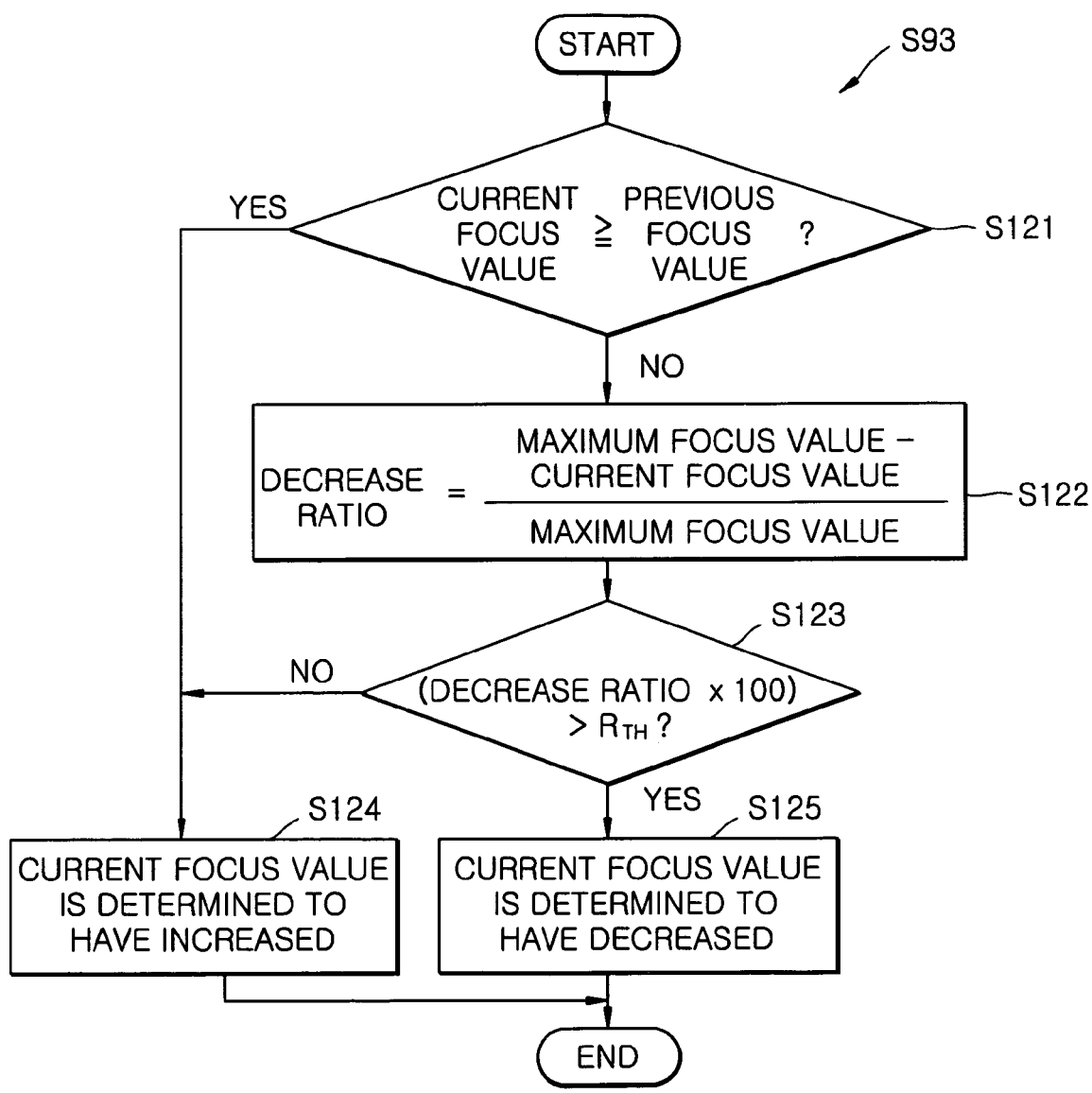
FIG. 17 is a flowchart illustrating S93 of FIG. 12 according to another embodiment of the present invention.

FIG. 17 is a flowchart illustrating S93 of FIG. 12 according to another embodiment of the present invention. S93 will now be described with reference to FIG. 17. The embodiment of S93 illustrated in FIG. 17 enables more accurate determination about whether the overall focus value FV has increased or decreased than the embodiment of S93 illustrated in FIG. 16.

If the current focus value FV is greater than a previous focus value, the DCP 507 determines that the current overall focus value FV has increased and ends S93 (S121 and S124). If the current focus value FV is less than the previous value, the DCP 507 performs the following step.

The DCP 507 calculates a decrease ratio using Equation 1 (S122). If the decrease ratio expressed as a percentage is greater than the first reference percentage $R_{TH}$ from the first reference characteristic curve C1, the DCP 507 determines that the current focus value FV has decreased (S123 and S125). If not, the DCP 507 determines otherwise (S123 and S124).

As described above, according to an automatic focusing method and a digital photographing apparatus using the same, a final focal position value selected from focal position values of a plurality of sub-regions is commonly applied to a horizontal direction or a vertical direction and has a short focal distance. Therefore, there is a high probability that the position of a subject desired by a user will be brought into focus. In addition, balanced focusing can be maintained throughout the entire photograph region.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An automatic focusing method in which a photograph region is brought into focus through automatic movement of a focal lens to a focal position, in response to a photographing-command signal, the method comprising:
   (a) dividing the photograph region into a plurality of sub-regions wherein all sub-regions of the photographic region having a common horizontal position define a horizontal row, and wherein all sub-regions of the photographic region having a common vertical position define a vertical column;
   (b) obtaining focal position values for the sub-regions;
   (c) selecting, for each of more than one horizontal row, a first focal position value from the sub-regions, if all sub-regions of one of the horizontal rows have the same first focal position value;
   (d) selecting, for each of more than one vertical column, a second focal position value from the sub-regions, if all sub-regions of one of the vertical columns have the same second focal position value;
   (e) selecting from the first and second focal position values, a particular focal position value having the shortest focal distance; and
   (f) moving the focal lens to a focal position corresponding to the particular focal position value.

2. The method of claim 1, wherein if only one focal position value is selected in (c) and (d), the focal lens is moved to the focal position corresponding to the selected focal position value.

3. The method of claim 1, further comprising, if a focal position value is not selected in (c) and (d):
   (g) selecting each focal position value from each horizontal row if all but one of the sub-regions in a horizontal row have the same focal position value;
   (h) selecting each focal position value from each vertical column if all but one of the sub-regions in a vertical column have the same focal position value;
   (i) selecting the focal position values selected in (g), if a difference between the selected focal position value and a non-selected focal position value in a horizontal row is equal to or less than a threshold value;
   (j) selecting from the focal position values selected in (h), if a difference between the selected focal position value and a non-selected focal position value in a vertical column is equal to or less than a threshold value;
   (k) selecting from the focal position values selected in (i) and (j), a particular focal position value having the shortest focal distance; and
   (l) moving the focal lens to a focal position corresponding to the particular focal position.

4. The method of claim 3, further comprising, if a focal position value is not selected in (g) and (h):
   (m) selecting each focal position value from each horizontal row if all but two sub-regions in a horizontal row have the same focal position value;
   (n) selecting each focal position value from each vertical column if all but two sub-regions in a vertical column have the same focal position value;
   (o) selecting from the focal position values selected in (m), if a difference between the selected focal position value and a non-selected focal position value in a horizontal row is equal to or less than a threshold value;
   (p) selecting from the focal position values selected in (n), if a difference between the selected focal position value and a non-selected focal position value in a vertical column is equal to or less than a threshold value;
   (q) selecting from the focal position values selected in (o) and (p), a particular focal position value having the shortest focal distance; and
   (r) moving the focal lens to a focal position corresponding to the particular focal position value.

5. A digital photographing apparatus, comprising;
   a lens;
   a lens driver that moves the lens to a focal position specified by a focal position value;
   a processor for running an automatic focusing operational algorithm in response to a photographing command signal that performs:
      (a) dividing the photograph region into a plurality of sub-regions wherein all sub-regions of the photograph region having a common horizontal position define a horizontal row, and wherein all sub-regions of the photographic region having a common vertical position define a vertical column;
      (b) obtaining focal position values for the sub-regions;

(c) selecting a first focal position value from the sub-regions, if all sub-regions of one of the horizontal rows have the same first focal position value;

(d) selecting, for each of more than one vertical column, a second focal position value from the sub-regions, if all sub-regions of one of the vertical columns have the same second focal position value;

(e) selecting from the first and second focal position values, a particular focal position value having the shortest focal distance; and (f) moving the focal lens to a focal position corresponding to the particular focal position value.

6. The digital photographing apparatus of claim 5, wherein if only one focal position value is selected in (c) and (d), the focal lens is moved to the focal position corresponding to the selected focal position value.

7. The digital photographing apparatus of claim 5, further comprising, if a focal position value is not selected in (c) and (d):

(g) selecting each focal position value from each horizontal row if all but one of the sub-regions in a horizontal row have the same focal position value;

(h) selecting each focal position value from each vertical column if all but one of the sub-regions in a vertical column have the same focal position value;

(i) selecting the focal position values selected in (g), if a difference between the selected focal position value and a non-selected focal position value in a horizontal row is equal to or less than a threshold value;

(j) selecting from the focal position values selected in (h), if a difference between the selected focal position value and a non-selected focal position value in a vertical column is equal to or less than a threshold value;

(k) selecting from the focal position values selected in (i) and (j), a particular focal position value having the shortest focal distance; and (l) moving the focal lens to a focal position corresponding to the particular focal position.

8. The digital photographing apparatus of claim 7, further comprising, if a focal position value is not selected in (g) and (h):

(m) selecting each focal position value from each horizontal row if all but two sub-regions in a horizontal row have the same focal position value;

(n) selecting each focal position value from each vertical column if all but two sub-regions in a vertical column have the same focal position value;

(o) selecting from the focal position values selected in (in), if a difference between the selected focal position value and a non-selected focal position value in a horizontal row is equal to or less than a threshold value;

(p) selecting from the focal position values selected in (n), if a difference between the selected focal position value and a non-selected focal position value in a vertical column is equal to or less than a threshold value;

(q) selecting from the focal position values selected in (o) and (p), a particular focal position value having the shortest focal distance; and (r) moving the focal lens to a focal position corresponding to the particular focal position value.

* * * * *